(12) United States Patent
Toyama

(10) Patent No.: US 11,926,196 B2
(45) Date of Patent: Mar. 12, 2024

(54) HANDLE DEVICE FOR VEHICLE

(71) Applicant: ALPHA CORPORATION, Kanagawa (JP)

(72) Inventor: Takao Toyama, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 3 days.

(21) Appl. No.: 17/691,822

(22) Filed: Mar. 10, 2022

(65) Prior Publication Data

US 2022/0194188 A1 Jun. 23, 2022

Related U.S. Application Data

(63) Continuation of application No. PCT/JP2020/030014, filed on Aug. 5, 2020.

(30) Foreign Application Priority Data

Sep. 11, 2019 (JP) .................................. 2019-165089

(51) Int. Cl.
*E05B 85/16* (2014.01)
*B60J 5/04* (2006.01)
(Continued)

(52) U.S. Cl.
CPC .................. *B60J 5/04* (2013.01); *E05B 77/06* (2013.01); *E05B 85/107* (2013.01); *E05B 85/16* (2013.01)

(58) Field of Classification Search
CPC .......... E05B 77/02; E05B 77/04; E05B 77/06; E05B 85/10; E05B 85/103; E05B 85/107;
(Continued)

(56) References Cited

U.S. PATENT DOCUMENTS 5,388,901 A 2/1995 Asano
9,580,942 B2 2/2017 Sobecki et al.
(Continued)

FOREIGN PATENT DOCUMENTS

EP 3396088 A1 * 10/2018 ............ E05B 77/06
JP H06-016091 A 1/1994
(Continued)

OTHER PUBLICATIONS

International Search Report issued in PCT/JP2020/030014; dated Sep. 1, 2020.
(Continued)

*Primary Examiner* — Christine M Mills
*Assistant Examiner* — Noah Horowitz
(74) *Attorney, Agent, or Firm* — Studebaker & Brackett PC

(57) ABSTRACT

A handle device for a vehicle includes a handle body, a latch release lever, a door latch device, an electric actuator and a push portion forming member. The handle body moves between an initial position, a pop-up position and to a latch operation position. The door latch device is released by the latch release lever rotating to a latch release position. The push portion forming member moves from an initial corresponding position to a latch operation corresponding position and has a lever push portion to, when the push portion forming member is at the latch operation corresponding position, rotate the latch release lever to the latch release position. The push portion forming member has a restriction wall to prevent, when the push portion forming member is between the initial corresponding position and a pop-up corresponding position, the latch release lever from rotating toward the latch release position.

5 Claims, 11 Drawing Sheets

(51) Int. Cl.
*E05B 77/06* (2014.01)
*E05B 85/10* (2014.01)

(58) Field of Classification Search
CPC ........ E05B 85/14; E05B 85/16; E05B 1/0092; E05B 5/00; E05B 5/003; E05B 5/006
See application file for complete search history.

(56) References Cited

U.S. PATENT DOCUMENTS

| | | | |
|---|---|---|---|
| 10,309,133 B2 * | 6/2019 | Han | E05B 79/20 |
| 10,378,252 B2 * | 8/2019 | Ottino | E05B 81/68 |
| 10,954,702 B2 * | 3/2021 | Couto Maquieira | E05B 81/16 |
| 10,975,598 B2 * | 4/2021 | Guerin | E05B 85/16 |
| 11,391,073 B2 * | 7/2022 | Rhein | E05B 81/90 |
| 11,499,352 B2 * | 11/2022 | Guerin | E05B 85/107 |
| 11,536,058 B2 * | 12/2022 | Han | E05B 85/103 |
| 11,560,741 B2 * | 1/2023 | Guerin | E05B 85/107 |
| 11,643,856 B2 * | 5/2023 | Jeong | E05B 81/40 292/336.3 |
| 11,680,432 B2 * | 6/2023 | Sobecki | E05B 85/103 292/336.3 |
| 2013/0121008 A1 | 5/2013 | Muller et al. | |
| 2013/0241215 A1 | 9/2013 | Halliwell et al. | |
| 2016/0273247 A1 | 9/2016 | Fujiwara | |
| 2016/0298366 A1 | 10/2016 | Och | |
| 2020/0087956 A1 | 3/2020 | Guerin | |
| 2020/0115936 A1 | 4/2020 | Och | |
| 2021/0156178 A1 * | 5/2021 | Heyduck | E05B 85/107 |
| 2021/0363793 A1 * | 11/2021 | Rhein | E05B 81/90 |

FOREIGN PATENT DOCUMENTS

| | | |
|---|---|---|
| JP | 2015-090028 A | 5/2015 |
| JP | 2016-537532 A | 12/2016 |
| WO | 2018/210903 A1 | 11/2018 |

OTHER PUBLICATIONS

The extended European search report issued by the European Patent Office dated Aug. 28, 2023, which corresponds to European Patent Application No. 20862967.5-1005 and is related to U.S. Appl. No. 17/691,822.

* cited by examiner

HANDLE DEVICE FOR VEHICLE

CROSS-REFERENCE TO RELATED APPLICATIONS

The present application is a continuation application of PCT/JP2020/030014 that claims priority to Japanese Patent Application No. 2019-165089 filed on Sep. 11, 2019, the entire content of which is incorporated herein by reference.

TECHNICAL FIELD

The presently disclosed subject matter relates to a handle device for a vehicle.

BACKGROUND

Patent Literature 1 discloses a handle device having a flash surface specification, which is accommodated in a recess formed in a vehicle door or the like when not in use and is moved to a projecting position by an electric actuator when in use.

The handle device of Patent Literature 1 includes an outer handle (handle body) that is rotatable about a rotation axis, a handle lever that is rotatable about a predetermined rotation axis and includes a link hole into which a linking protrusion formed in the handle body is fitted, and a drive lever that is rotationally driven by an electric motor.

When the electric motor is driven when the handle body is held at an initial portion when not in use, the drive lever rotates, and an abutment pin is pushed against a pin provided on the drive lever to rotate the handle lever, whereby the handle body moves from the initial position to a pop-up position.

When the handle body is further rotated from the pop-up position, a pressure receiving portion is pushed by a latch mechanism side arm portion provided in the drive lever in accordance with rotation of the drive lever, whereby a latch release lever is rotated, and a latch mechanism connected to the latch release lever is unlocked.

An inertia lever is rotatably connected to a support case to which the handle body is attached. When an impact due to a collision is applied, the inertia lever rotates to a restriction position and restricts an operation of the handle body at the initial position to prevent an inadvertent release operation of a door lock and an accompanying opening operation of a door.

Patent Literature 1: JP2015-090028A

In the handle device of Patent Literature 1, the latch release lever is pushed by the handle lever to operate, and can rotate independently from the handle lever toward a latch unlocking operation direction. Therefore, in a case where an impact due to a collision is applied, for example, even if the handle lever is provided with movement restriction means against a collision impact force and thus the handle lever is not operated, only the latch release lever may rotate due to an inertia force to release the door lock, so the reliability against collision is low.

SUMMARY

According to the embodiment of the presently disclosed subject matter, in the handle device for a vehicle, it is possible to prevent an inadvertent door lock releasing operation due to an independent operation of the latch release lever alone in the event of an impact being applied due to a collision.

According to the embodiment of the presently disclosed subject matter, a handle device for a vehicle includes a handle body 2, a latch release lever 3, a door latch device configured to be provided in a door 4 of the vehicle, an electric actuator and a push portion forming member 5. The handle body 2 is configured to be driven from an initial position to a pop-up position by the electric actuator 1 and is manually operated further to a latch operation position beyond the pop-up position, and the door latch device is configured such that a latch of the door latch device 4 is released by the latch release lever 3 rotating to a latch release position. The push portion forming member 5 is configured to move from an initial corresponding position to a latch operation corresponding position in accordance with an operation of the handle body 2, the initial corresponding position corresponding to the initial position of the handle body 2 and the latch operation corresponding position corresponding to the latch operation position of the handle body 2. The push portion forming member 5 has a lever push portion 6 configured to, when the push portion forming member is located at the latch operation corresponding position, push and rotate the latch release lever 3 to the latch release position. The push portion forming member 5 has a restriction wall 7. The restriction wall 7 prevents, when the push portion forming member is located at a position between the initial corresponding position and a pop-up corresponding position corresponding to the pop-up position of the handle body, the latch release lever 3 from rotating toward the latch release position.

In the presently disclosed subject matter, when the handle body 2 having been driven to the pop-up position by the electric actuator 1 is further operated to the latch operation position, the push portion forming member 5 operating in accordance with the operation of the handle body 2 moves from the initial corresponding position corresponding to the initial position of the handle body 2 to the latch operation corresponding position via the pop-up corresponding position corresponding to the pop-up position. With movement of the push portion forming member 5, the lever push portion 6 formed in the push portion forming member 5 pushes the latch release lever 3 to rotate the latch release lever 3 to the latch release position, thereby operating the door latch device 4.

When an impact force due to a collision such as a side collision is applied to the handle device, it is not possible to prevent the latch release lever 3 from operating independently toward a direction of the latch release position due to an inertia force even if the push portion forming member 5 is provided with appropriate movement restriction means for the time of a collision impact to restrict an operation by the inertial force, the latch release lever 3 operating in response to a push operation from the lever push portion 6 and being not directly connected to the push portion forming member 5.

In the presently disclosed subject matter in which the restriction wall 7 is provided in the push portion forming member 5 to restrict the independent operation of the latch release lever 3, the latch release lever 3 does not operate alone due to an impact load to an extent that the push portion forming member 5 does not operate, or due to a bound by the impact load, and thus it is possible to prevent inadvertent door opening.

The push portion forming member 5 may be formed integrally with the handle body 2 as long as the push portion forming member 5 is movable from the initial corresponding position to the latch operation corresponding position in accordance with the operation of the handle body 2, or may be formed as a link member having one end thereof rotatably connected to the handle body 2.

The handle device for a vehicle may further include a handle base 8, a drive arm 9, and an operation link 10. The drive arm is configured such that one end of the drive arm 9 may be rotatably connected to one end of the handle body 2, the other end of the drive arm 9 may be rotatably connected to the handle base 8, and the drive arm 9 may be driven by the electric actuator 1. The operation link 10 may form a link mechanism together with the handle body 2, the drive arm 9, and the handle base 8. One end of the operation link 10 may be rotatably connected to the other end of the handle body 2, and the other end of the operation link 10 may be rotatably connected to the handle base 8. The operation link 10 may include the push portion forming member 5.

In this aspect, when the drive arm 9 is rotationally driven by the electric actuator 1 such as a motor, the handle body 2, which is connected to the operation link 10 at one end and to the drive arm 9 at the other end and forms the link mechanism as a whole, moves from the initial position to the pop-up position. Thereafter, when the handle body 2 is further operated and moved to the latch operation position, the push portion forming member 5 provided in the operation link 10 and the latch release lever 3 are driven to operate the door latch device 4.

The link mechanism can be configured as a four-joint link mechanism by the handle base 8, the drive arm 9, the operation link 10, and the handle body 2, and in this case, a latch release operation of the door latch device 4 can be performed by manually pulling out the handle body 2 having been driven to the pop-up position by the electric actuator 1 further to the latch operation position.

When the four-joint link mechanism is configured as a parallel link mechanism, the handle body 2 moves in parallel from the initial position, and thus usability is improved.

In the handle device for a vehicle, a connection portion between the operation link 10 and the handle body 2 may have a sliding pair. The handle body 2 may be configured to move from the pop-up position to the latch operation position by a rotation operation of the handle body 2 about a rotation center of the handle body 2 with respect to the drive arm 9.

In the handle device for a vehicle, the lever push portion 6 may not contact the latch release lever 3 when the push portion forming member is located at the position between the initial corresponding position and the pop-up corresponding position. Since a non-contact region set between the lever push portion 6 and the latch release lever 3 can absorb an unauthorized operation due to error accumulation or the like of the lever push portion 6, operation reliability can be improved.

The handle device for a vehicle may further include an inertia stopper. The inertia, stopper may be configured to, when a collision impact load is applied, rotate to a stop position and prevent the push portion forming member 5 from moving toward the latch operation corresponding position. It is possible to reliably prevent unauthorized door opening due to the collision impact load.

According to the embodiment of the presently disclosed subject matter, it is possible to prevent an inadvertent door lock releasing operation due to an independent operation of the latch release lever alone in the event of an impact due to a collision.

DESCRIPTION OF EMBODIMENTS

A door handle device includes a handle base 8, a handle body 2, a drive arm 9 connecting the handle body 2 to the handle base 8, and an operation link 10, and is to be fixed to a door of a vehicle at the handle base 8.

Figure 1:
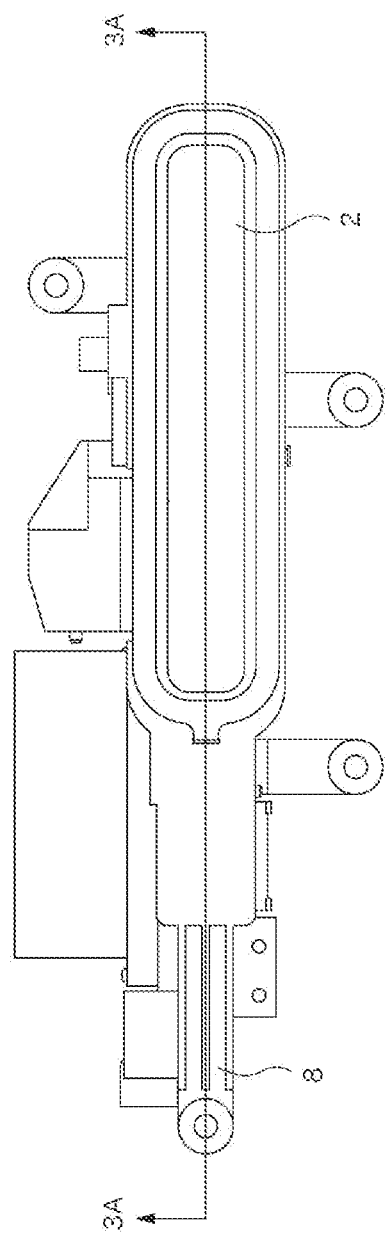
FIG. 1 is a front view of a handle device.
Figure 3:
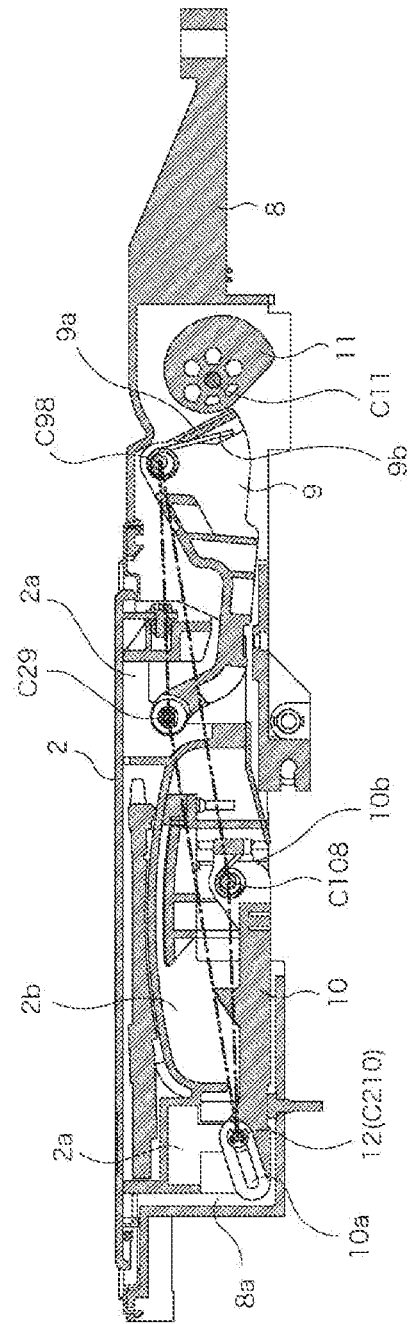
FIG. 3 is a cross-sectional view taken along a line 3A-3A of FIG. 1.
Figure 6A:
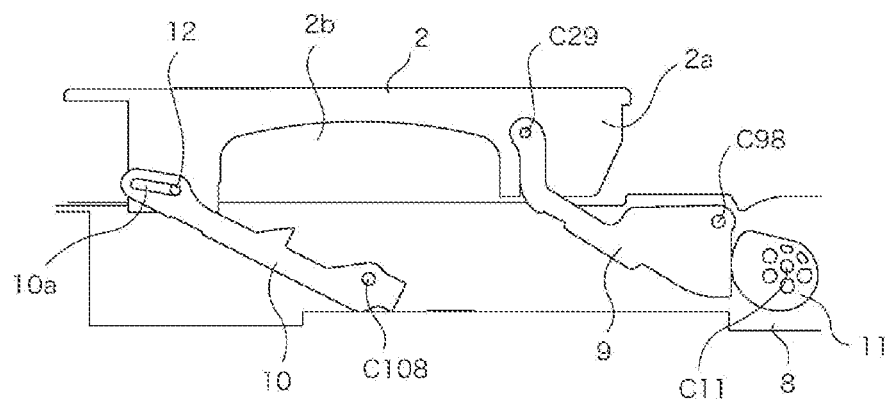
FIG. 6A shows a pop-up position of a handle body in an operation of a handle.
Figure 6B:
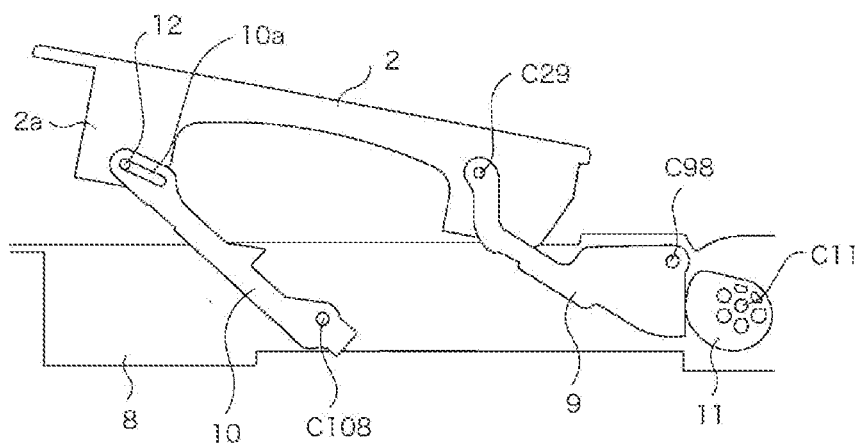
FIG. 6B shows a latch operation position in the operation of the handle.

With the handle base 8 fixed to the door, the handle body 2 can be moved from an initial position shown in FIGS. 1 and 3 to a pop-up position shown in FIG. 6A and further to a latch operation position at which one end of the handle body 2 is pulled up from the pop-up position as shown in FIG. 6B.

The door handle device has a flush surface specification in which the handle body 2 is accommodated in the door and a surface of the handle body 2 is substantially in the same plane as a door surface when not in use. The initial position of the handle body 2 corresponds to a non-use posture. The handle base 8 is formed with a handle accommodating recess 8a to accommodate the handle body 2 when the handle body 2 is at the initial position (see FIG. 3).

As shown in FIG. 3, the drive arm 9 and the operation link 10 are connected to the handle base 8 so as to be rotatable about rotation centers C98 and C108. The rotation centers C98 and C108 of the drive arm 9 and the operation link 10 with respect to the handle base 8 are appropriately spaced apart from each other in a front-rear direction, that is, in a longitudinal direction of the handle base 8, and the rotation center C98 of the drive arm 9 is disposed in front of the rotation center C108 of the operation link 10.

In this description, a left side of FIG. 1 is referred to as "front", a right side is referred to as "rear", a direction directed out of the page of FIG. 1 is referred to as a "front surface" direction, and an opposite direction thereof is referred to a "back surface" direction.

Figure 4A:
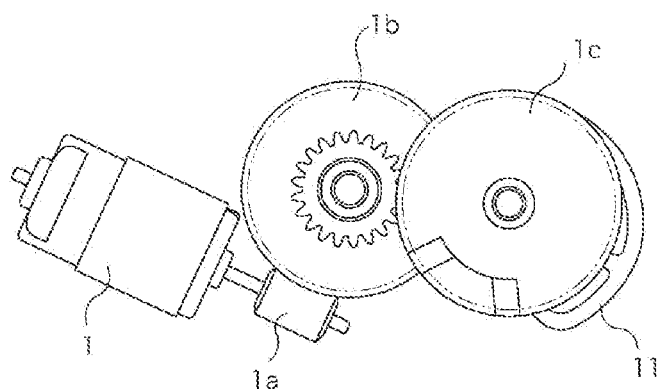
FIG. 4A shows power transmission of an electric actuator in a drive source of a drive arm.

An electric actuator 1 such as a motor is to be fixed to the handle base 8, and as shown in FIG. 4A, power of the motor 1 is transmitted to a cam 11 rotatably connected to the handle base 8 via a worm 1a, a worm wheel 1b, and a reduction gear 1c.

A pressed portion 9a is formed on the drive arm 9 so as to correspond to the cam 11 to be rotationally driven around a rotation center C11 and is pushed by the cam 11, and thus the drive arm 9 rotates about the rotation center C98 from an initial corresponding position corresponding to the initial position of the handle body 2 to a pop-up corresponding position corresponding to the pop-up position of the handle body 2 in accordance with rotation of the cam 11.

In order to ensure the contact of the pressed portion 9a with the cam 11, a torsion spring 9b is mounted around the rotation center C98 between the handle base 8 and the drive arm 9 to bias the drive arm 9 counterclockwise in FIG. 3.

Figure 4B:
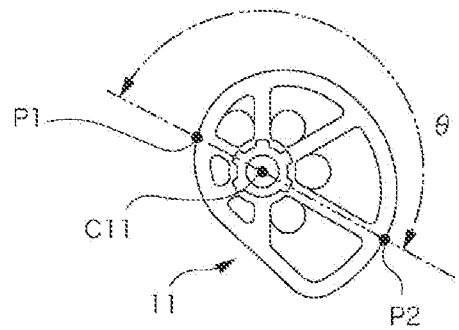
FIG. 4B shows a cam in the drive source of the drive arm.

As shown in FIG. 4B, the cam 11 comes into contact with the pressed portion 9a at a start point P1 when the handle body 2 is at the initial position, and rotates counterclockwise by an angle θ about the rotation center C11 in FIG. 4B while maintaining the contact with the pressed portion 9a. When the cam 11 comes into contact with the pressed portion 9a at an end point P2, the handle body 2 moves to the pop-up position.

Figure 4C:
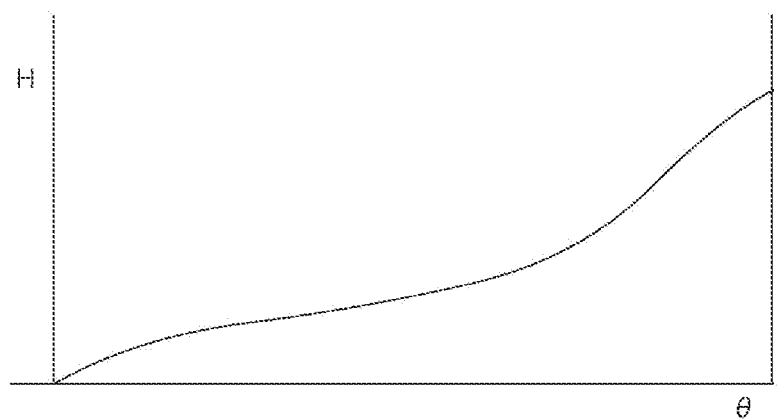
FIG. 4C shows a diagram of the cam in the drive source of the drive arm.
Figure 5A:
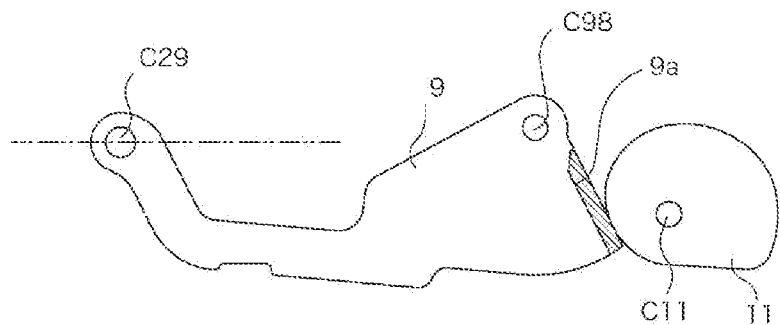
FIG. 5A shows a state in which the drive arm is at an initial corresponding position in an operation of the cam.
Figure 5B:
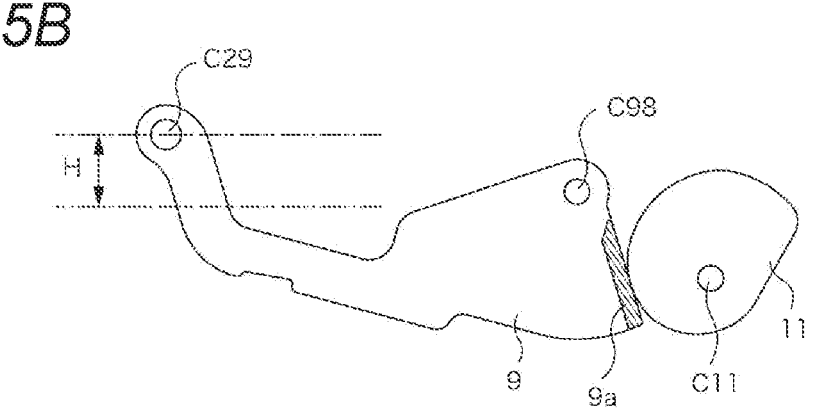
FIG. 5B shows a state between the initial corresponding position and a pop-up corresponding position in the operation of the cam.
Figure 5C:
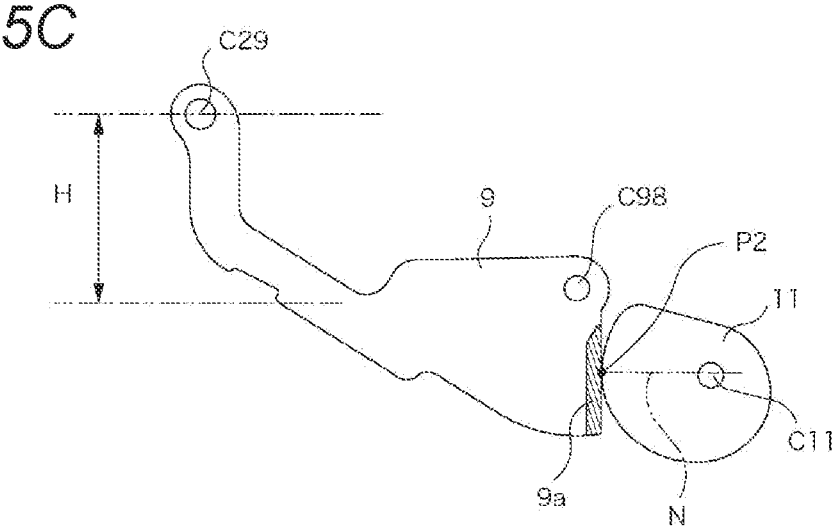
FIG. 5C shows the pop-up corresponding position in the operation of the cam.

FIGS. 5A to 5C are explanatory views showing a state in which the drive arm 9 is operated by the cam 11. FIG. 5A shows a state in which the drive arm 9 is at the initial corresponding position, FIG. 5C shows a state in which the drive arm 9 is at the pop-up corresponding position, and FIG. 5B shows a state in which the drive arm 9 is on the way from the initial corresponding position to the pop-up corresponding position. A reference numeral H shown in FIGS. 5B and 5C denotes a movement amount of a connection point C29 of the drive arm 9 with the handle body 2. FIG. 4C is a cam diagram of the cam 11 for obtaining the movement amount. A horizontal axis represents a rotation angle θ of the cam 11, and a vertical axis represents the movement amount H in a height direction of the connection point C29 with the handle body 2.

As shown in FIG. 4C, the cam 11 is configured such that an increment in a movement distance of the connection point C29 of the drive arm 9 with the handle body 2 in a height direction per unit angle is small in an initial stage of rotation and gradually increases as the cam 11 approaches the end point. Immediately after starting to be driven by the motor 1, the cam 11 slowly ascends in a vertical direction, and is driven so as to gradually increase an ascending speed as the handle body 2 approaches the pop-up position.

As a result, a driving force is maximized at an initial stage of driving when the ascending speed is low, that is, when the handle body 2 starts to move from the initial position. By virtue of this configuration, for example, even when thin ice is formed around the handle body 2, it is possible to expect a sufficient driving force for crushing the ice and prevent an operation failure due to freezing.

When the handle body returns from the pop-up position to the initial position, since a descending speed decreases in a vicinity of the initial position, it is possible to prevent a collision with the handle base 8, packing, or the like, and it is possible to prevent an occurrence of collision noise, rebound, or the like.

Further, as shown in FIG. 5C, when the drive arm 9 is at the pop-up corresponding position, the rotation center C11 of the cam 11 is disposed in a vicinity of a normal line N drawn down from a contact point with the pressed portion 9a. Therefore, a horizontal component when a force is applied from the pressed portion 9a to the contact point P2 of the cam 11, that is, a force to rotate the cam 11, is small.

Therefore, even if a load toward the initial position, that is, a force for pushing the handle body 2 is applied to the handle body 2 when the handle body 2 is at the pop-up corresponding position, only a force directed toward the rotation center is generally applied to the cam 11, and a force in a direction perpendicular to the force is small. Therefore, a rotational operation force applied to the cam 11 is small, and a force applied to a worm from a worm wheel can be small.

As shown in FIGS. 3, 6A, and 6B, the handle body 2 is provided with link connection portions 2a protruding toward a back-surface side and provided at both front and rear end portions of the handle body, and a handhold recess 2b serving as a handhold when the handle body 2 is operated is formed between the front and rear link connection portions 2a.

The other end of the drive arm 9, which is connected to the handle base 8 at one end, is rotatably connected to the front link connection portion 2a of the handle body 2, and the other end of the operation link 10 is connected to the rear link connection portion 2a.

The connection between the operation link 10 and the handle body 2 is rotatable and slidable. In this example, a connection pin 12 that is fixed to the rear link connection portion 2a and provides a rotation center C210 is inserted into a long hole 10a formed in an end portion of the operation link 10, and thus the rotation center C210, that is, the connection pin 12 is slidable. The connection pin 12 is inserted into the long hole 10a and then retained by retaining member as appropriate.

As shown in FIG. 3, the rotation center C98 of the drive arm 9 with the handle base 8, the connection point C29 of the drive arm 9 and the handle body 2, the connection pin 12 of the handle body 2, and the rotation center C108 of the operation link 10 with respect to the handle base 8 are disposed at vertex positions of a parallelogram. The long hole 10a has one end position (initial end position) that is a position of the connection pin 12 at the vertex position of the parallelogram, and extends in a rearward and slightly back surface direction, that is, in a direction in which a link length of the operation link 10 is extended by sliding of the connection pin 12.

As shown in FIG. 3, the operation link 10 is biased toward the initial corresponding position corresponding to the initial position of the handle body 2 by a torsion spring 10b wound around the rotation center C108 of the operation link 10 with the handle base 8, the torsion spring 9b that biases the drive arm 9 toward the initial corresponding position corresponding to the initial position of the handle body 2 is wound around the rotation center C98 of the drive arm 9 with respect to the handle base 8 as described above, and the torsion spring 10b biases the connection pin 12 toward the initial end position in the long hole 10a, that is, toward the vertex position of the parallelogram and holds the connection pin 12 at the position.

Therefore, in this example, when the electric actuator 1 is driven to rotate the cam 11 counterclockwise in FIG. 3 when the handle body 2 is at the initial position shown in FIG. 3, the drive arm 9 rotates clockwise about the rotation center.

As described above, since the operation link 10 and the handle body 2 are held, by actions of the torsion springs 10b and 9b, at the initial corresponding position where the connection pin 12 minimizes the link length of the operation link 10b, the drive arm 9, the operation link 10, the handle body 2, and the handle base 8 form a parallel crank mechanism having the handle base 8 as a fixed link, and the handle body 2 moves from the initial position to the pop-up position shown in FIG. 6A by the rotation of the drive arm 9 while holding a parallel posture.

When the handle body 2 reaches the pop-up position, the drive of the electric actuator 1 is stopped by a switch (not shown), and the handle body 2 is held at the pop-up position. When the electric actuator 1 is reversely driven from this state, the drive arm 9 returns to the initial corresponding position by the torsion spring wound around the rotation center and the handle body 2 returns to the initial position.

At the pop-up position, the handle body 2 is held in a posture parallel to the door surface. Thereafter, by pulling out a rear end side of the handle body 2 to an outside of the door, the handle body 2 is rotated about the rotation center with the drive arm 9 until the handle body 2 comes into contact with a stopper (not shown), and as shown in FIG. 6B, the handle body 2 can be moved to a latch release position inclined from the front-end portion toward the rear end portion.

The rotation of the handle body 2 from the pop-up position to the latch release position is performed by a manual rotation operation, and in accordance with the rotation operation of the handle body 2 to the latch release position, the operation link 10 further rotates beyond the pop-up corresponding position corresponding to the pop-up position of the handle body 2 and rotates to a latch operation corresponding position.

In this example, an operation of the door latch device 4 is performed by operating the latch release lever 3 by the push portion forming member 5 fixed to the operation link 10.

Figure 7A:
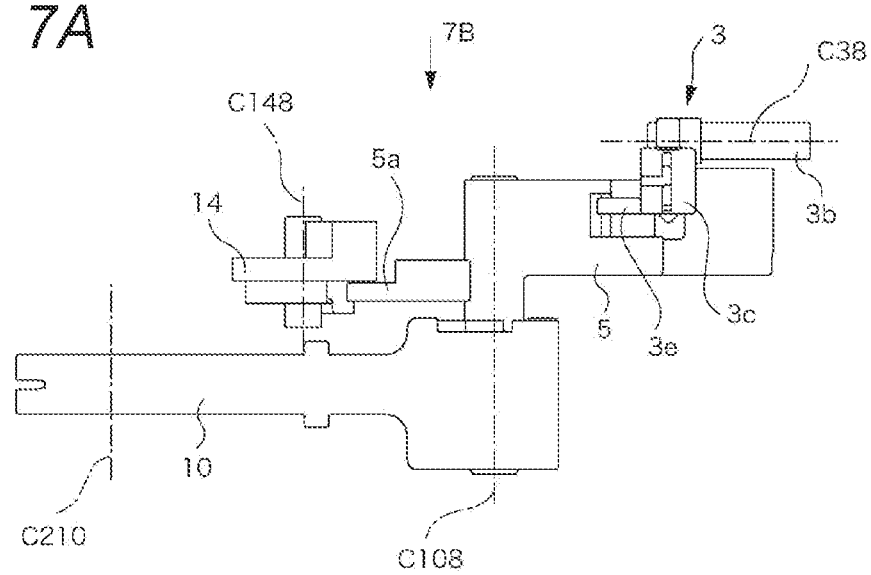
FIG. 7A is an enlarged view of a main part of FIG. 2 in a latch release lever.
Figure 7B:
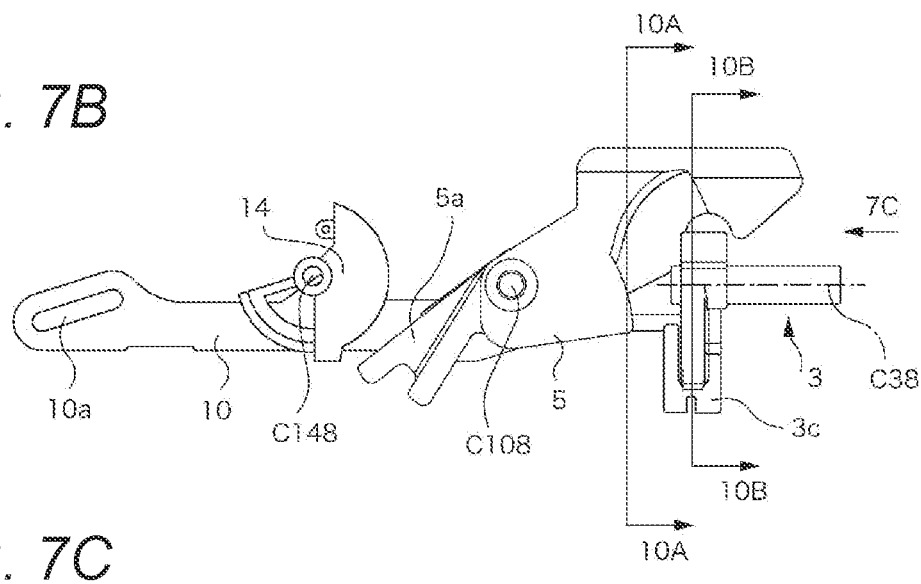
FIG. 7B is a view taken in a direction of an arrow 7B in FIG. 7A.

As shown in FIGS. 7A and 7B, the push portion forming member 5 is fixed on the rotation center of the operation link 10 with the handle base 8, and rotates around the rotation center C108 in accordance with the rotation of the operation link 10.

Figure 8A:
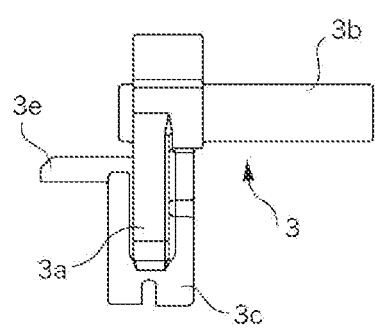
FIG. 8A is a view taken in a direction of an arrow 8A in FIG. 8B.
Figure 8B:
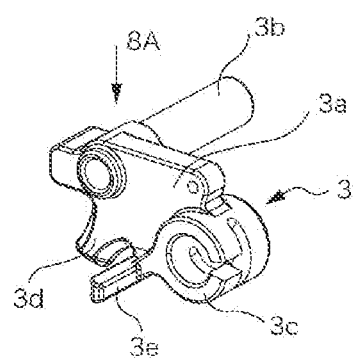
FIG. 8B is a perspective view.

The latch release lever 3 is rotatable connected to the handle base 8 around a rotation center C38 perpendicular to the rotation center C108 of the operation link 10 with respect to the handle base 8. As shown in FIGS. 8A and 8B, the latch release lever 3 includes a plate-like body portion 3a, a cylindrical portion 3b through which a rotation shaft is inserted, the cylindrical portion 3b protruding from a plate-like body portion 3a, and a cable connecting portion 3c for holding a tip of an inner cable (not shown) of a cable device 13, the cable connecting portion 3c being formed in a vicinity of the cylindrical portion 3b.

Figure 7C:
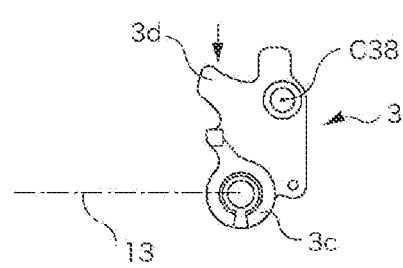
FIG. 7C is a view of the latch release lever as viewed from a direction of an arrow 7C in FIG. 7B.

The latch release lever 3 is biased clockwise in FIG. 7C by a torsion spring (not shown) wound around the rotation center C38, and is held at an initial position shown in FIG. 7C.

Figure 2:
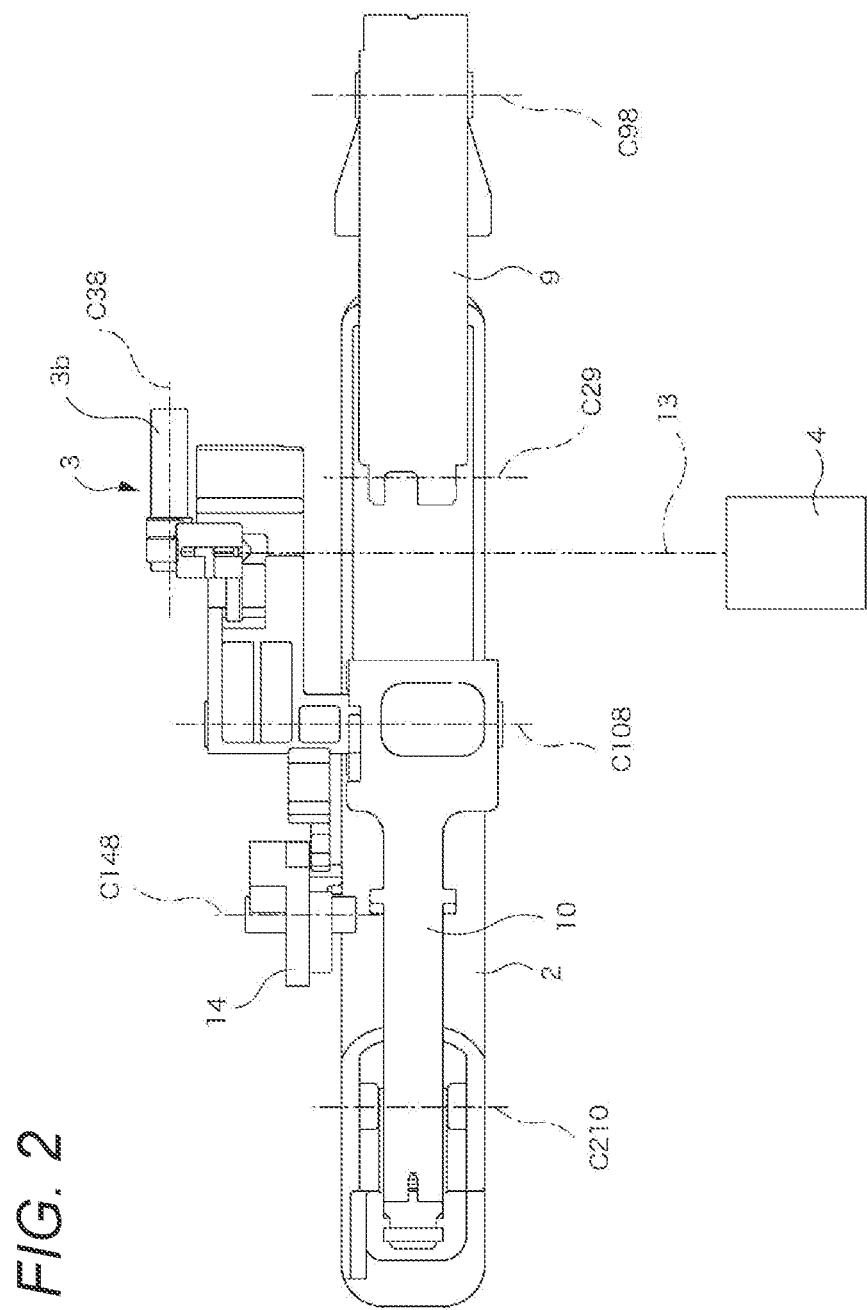
FIG. 2 is a rear view of the handle device.

Further, the latch release lever 3 includes a pushed portion 3d. As will be described later, the pushed portion 3d is pushed by the lever push portion 6 of the push portion forming member 5, whereby the latch release lever 3 rotates counterclockwise in FIG. 7C to apply a pulling operation force to the cable device 13 and operate the door latch device 4 (see FIG. 2).

As shown in FIGS. 9A to 9D, the push portion forming member 5 includes a stopper piece 5a at one end portion and a recess 5b configured to receive the plate-like body portion 3a of the latch release lever 3 at the other end portion, and the lever push portion 6 is formed on a peripheral wall portion of the recess 5b.

Figure 10A:
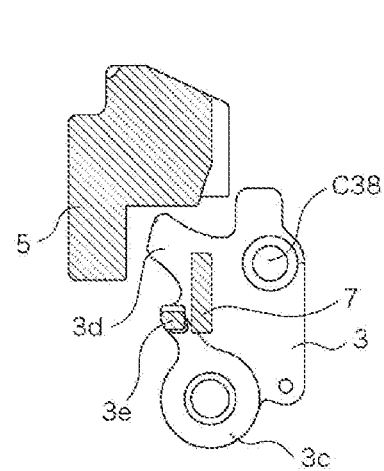
FIG. 10A is a cross-sectional view taken along a line 10A-10A of FIG. 7B.
Figure 10B:
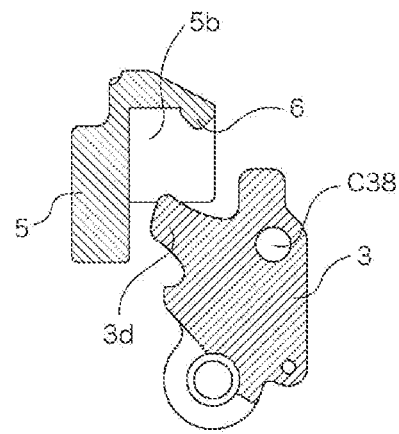
FIG. 10B is a cross-sectional view taken along a line 10B-10B of FIG. 7B.
Figure 10C:
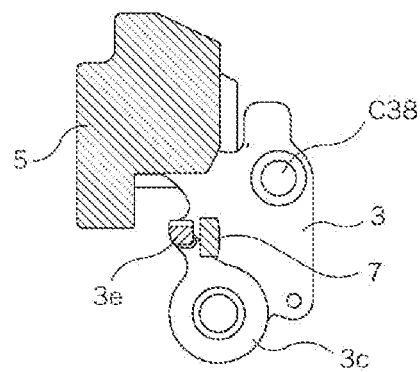
FIG. 10C is a view corresponding to FIG. 10A when an operation link is at an intermediate position between the initial corresponding position and the pop-up corresponding position.
Figure 10D:
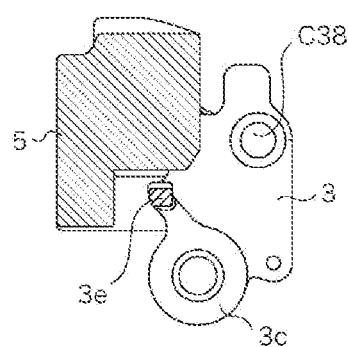
FIG. 10D is a view corresponding to FIG. 10A when the operation link is at the pop-up correspondence position.
Figure 10E:
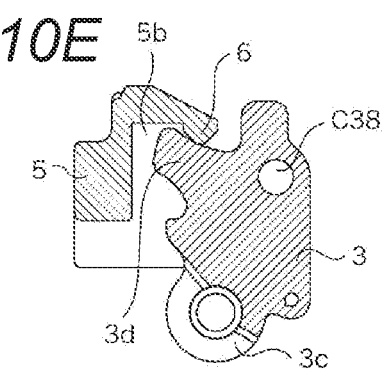
FIG. 10E is a view corresponding to FIG. 10B when the operation link is at the pop-up correspondence position.

The push portion forming member 5 moves from a state shown in FIG. 10B to a state shown in FIG. 10E in accordance with the rotation of the operation link 10 to the pop-up corresponding position, and the lever push portion 6 comes into contact with the pushed portion 3d of the latch release lever 3. Thereafter, when the handle body 2 is operated to the latch operation position and the operation link 10 is rotated to an operation corresponding position, the lever push portion 6 of the push portion forming member 5 pushes the pushed portion 3d of the latch release lever 3, and the latch release lever 3 rotates around the rotation center C38 to operate the door latch device 4.

Further, a weight portion 5c is formed in a vicinity of the lever push portion 6 of the push portion forming member 5 to adjust the moment of inertia of the push portion forming member 5. A value of the moment of inertia is set to such a magnitude that, when an impact force due to a collision is applied to the vehicle, an inertia force generated in the push portion forming member 5 by inertia and directed toward a direction to operate the latch release lever 3 will be canceled by inertia and the rotation in the direction will not be generated. A weight of the weight portion 5c, an arm length from the rotation center C108, and the like are determined based on the moment of inertia required for the push portion forming member 5.

Therefore, in this example, even when a collision impact force is applied, an operation force generated in the push portion forming member 5 is canceled by the moment of inertia of the push portion forming member 5, and thus, the latch release lever 3 is not pushed and inadvertent door opening is prevented.

Further, the push portion forming member 5 is provided with a restriction wall 7, and the latch release lever 3 is provided with a restriction protrusion 3e.

Figure 9A:
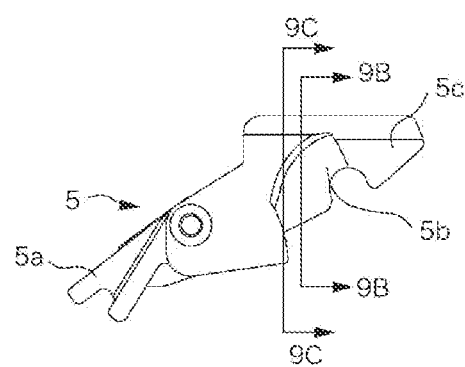
FIG. 9A is a view taken in a direction of an arrow 9A in FIG. 9D showing a push portion forming member.
Figure 9B:
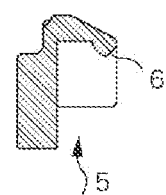
FIG. 9B is a cross-sectional view taken along a line 9B-9B of FIG. 9A.
Figure 9C:
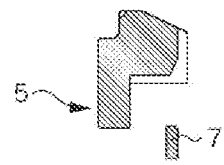
FIG. 9C is a cross-sectional view taken along a line 9C-9C of FIG. 9A.
Figure 9D:
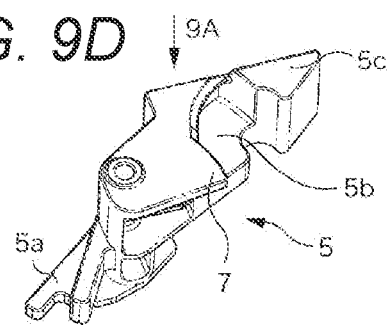
FIG. 9D is a perspective view of the push portion forming member.

As shown in FIGS. 8A and 8B, the restriction protrusion 3e is erected from the plate-like body portion 3a, and the restriction wall 7 is formed as a wall surface of the recess 5b as shown in FIG. 9C.

As shown in FIG. 10A, when the push portion forming member 5 is at the initial corresponding position, the rotation of the latch release lever 3 in a direction toward the latch release position, that is, counterclockwise rotation in FIG. 10A is impossible because the restriction wall 7 blocks a movement path of the restriction protrusion 3e, and it is possible to prevent the latch release lever 3 from moving independently to the latch release position due to an impact force such as a collision and from operating the door latch device 4.

The restriction of the rotation of the latch release lever 3 by the restriction wall 7 continues even at an intermediate position between the initial corresponding position and the pop-up corresponding position of the push portion forming member 5 as shown in FIG. 10C, and is eliminated when the push portion forming member 5 reaches the pop-up corresponding position as shown in FIG. 10D. Thereafter, the latch release lever 3 can be rotated by pushing the pushed portion 3d by the lever push portion 6 of the push portion forming member 5.

Further, an inertia stopper 14 for restricting the movement of the push portion forming member 5 when a collision load is applied to the vehicle is incorporated in the handle device. The inertia stopper 14 is rotatably connected to the handle base 8, rotates between a standby rotation position shown in FIG. 11A and a stop position shown in FIG. 11B, and is biased toward the standby rotation position by a torsion spring (not shown) wound around the rotation center C148.

Figure 11A:
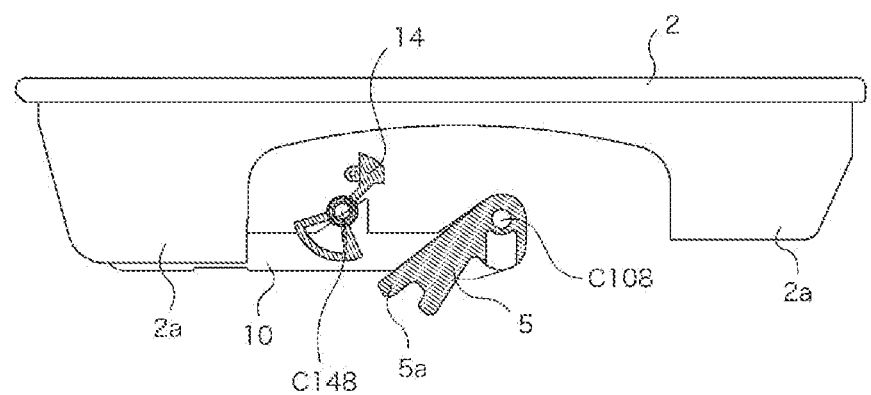
FIG. 11A shows a non-operating state in an operation of an inertia stopper.

The inertia stopper 14 is formed as a cylindrical body whose gravity center position is set so as to move from the standby rotation position to the stop position by inertia when a collision force due to a collision is applied. As shown in FIG. 11A, since a movement path (clockwise rotation around the rotation center C108 in FIG. 11A) of the stopper piece 5a of the push portion forming member 5 is opened at the standby rotation position, the rotation following a rotation operation of the operation link 10 to the latch operation corresponding position is allowed.

Figure 11B:
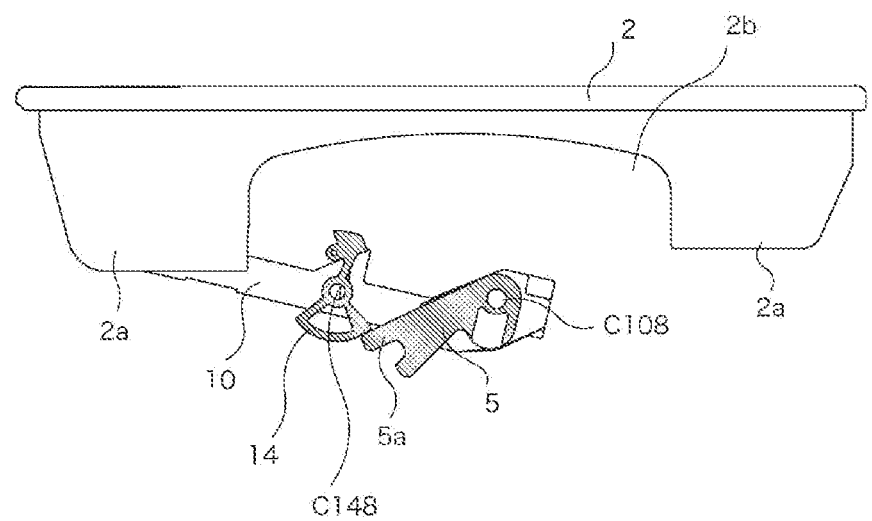
FIG. 11B shows a state in which the inertia, stopper is rotated to a stopper rotated position by an impact load in the operation of the inertia stopper.

On the other hand, when a collision force from a side of the vehicle is applied to the vehicle, the inertia stopper 14 rotates from the standby rotation position to the stop position. As shown in FIG. 11B, when the inertia stopper 14 is at the stop position, the inertia stopper 14 blocks the movement path of the stopper piece 5a of the push portion forming member 5, and thus the push portion forming member 5 stays at an interference position with the inertia stopper 14 without following the rotation of the operating link 10. Therefore, it is possible to reliably prevent the latch release lever 3 from operating and the door from being opened unnecessarily.

What is claimed is:

1. A handle device for a vehicle, comprising:
   a handle body;
   a latch release lever;
   a door latch device configured to be provided in a door of the vehicle;
   an electric actuator; and
   a push portion forming member,
   wherein the handle body is configured to be driven from an initial position to a pop-up position by the electric actuator and is manually operated further to a latch operation position beyond the pop-up position,
   wherein the door latch device is configured such that a latch of the door latch device is released by the latch release lever rotating to a latch release position,
   wherein the push portion forming member is configured to move from an initial corresponding position to a latch operation corresponding position in accordance with an operation of the handle body, the initial corresponding position corresponding to the initial position of the handle body and the latch operation corresponding position corresponding to the latch operation position of the handle body,
   wherein the push portion forming member has a lever push portion configured to, when the push portion forming member is located at the latch operation corresponding position, push and rotate the latch release lever to the latch release position,
   wherein the push portion forming member has a restriction wall,
   wherein the restriction wall prevents, when the push portion forming member is located at a position between the initial corresponding position and a pop-up corresponding position corresponding to the pop-up position of the handle body, the latch release lever from rotating toward the latch release position, and
   wherein the push portion forming member further comprises a weight portion disposed proximal the lever push portion configured to set a magnitude of the moment of inertia of the push portion forming member such that, when an impact force due to a collision is applied to the vehicle, an inertia force generated in the push portion forming member toward an operation direction of the latch release lever is canceled and rotation of the latch release lever in the operation direction is not generated.

2. The handle device according to claim 1, further comprising:
   a handle base;
   a drive arm; and
   an operation link,
   wherein the drive arm is configured such that one end of the drive arm is rotatably connected to one end of the handle body, the other end of the drive arm is rotatably connected to the handle base, and the drive arm is driven by the electric actuator,
   wherein the operation link forms a link mechanism together with the handle body, the drive arm, and the handle base,
   wherein one end of the operation link is rotatably connected to the other end of the handle body, and the other end of the operation link is rotatably connected to the handle base, and
   wherein the operation link includes the push portion forming member.

3. The handle device according to claim 2,
   wherein a connection portion between the operation link and the handle body has a sliding pair, and
   wherein the handle body is configured to move from the pop-up position to the latch operation position by a rotation operation of the handle body about a rotation center of the handle body with respect to the drive arm.

4. The handle device according to claim 1,
   wherein the lever push portion does not contact the latch release lever when the push portion forming member is located at the position between the initial corresponding position and the pop-up corresponding position.

5. The handle device according to claim 1, further comprising:
   an inertia stopper,
   wherein the inertia stopper is configured to, when a collision impact load is applied, rotate to a stop position and prevent the push portion forming member from moving toward the latch operation corresponding position.

* * * * *